United States Patent [19]
Hanson et al.

[11] 3,972,230
[45] Aug. 3, 1976

[54] DETECTING MALFUNCTION IN CYLINDERS OF INTERNAL COMBUSTION ENGINES

[75] Inventors: Richard Eric Hanson, Winchester; William Fulmer Fordyce, Arlington, both of Mass.

[73] Assignee: RCA Corporation, New York, N.Y.

[22] Filed: June 19, 1975

[21] Appl. No.: 588,385

[52] U.S. Cl. ................................................ 73/116
[51] Int. Cl.² ........................................ G01M 15/00
[58] Field of Search.................. 73/116, 117.3, 118; 235/151.3

[56] References Cited
UNITED STATES PATENTS
3,592,053    7/1971    Lucia................................... 73/116
FOREIGN PATENTS OR APPLICATIONS
239,689    7/1969    U.S.S.R............................... 73/116

Primary Examiner—Jerry W. Myracle
Attorney, Agent, or Firm—Edward J. Norton; Carl V. Olson

[57] ABSTRACT

An apparatus for, and method of, detecting the uneven operation of the individual cylinders in an internal combustion engine, and for diagnosing the cause thereof. The engine is operated at any convenient idle speed. Power cycle time periods between successive ignition times are measured, the deceleration rates between successive time periods are then computed, and finally the average deceleration rates for the respective cylinders are computed. Misfires occurring randomly in cylinders are detected when individual deceleration rates exceed the average deceleration rate for the corresponding cylinder by a predetermined limit amount. Repeated malfunctioning in an individual cylinder is detected when the average deceleration rate for the weakest cylinder exceeds that for the strongest cylinder by a predetermined limit amount.

7 Claims, 8 Drawing Figures

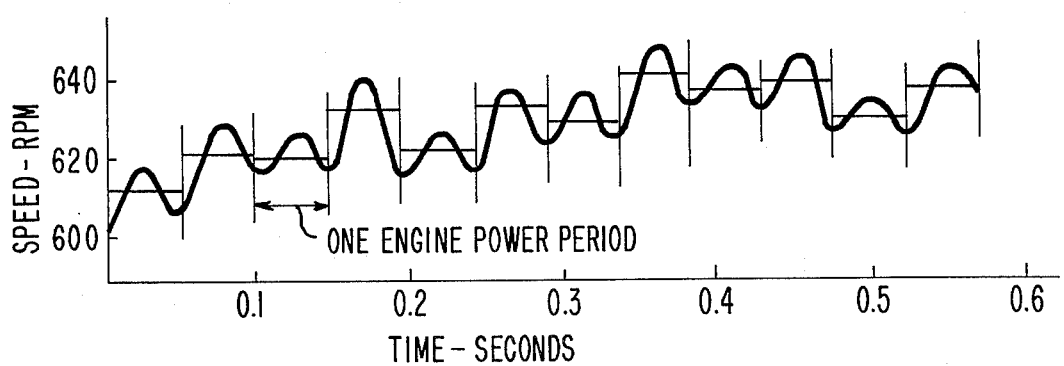
Fig.3 NORMAL
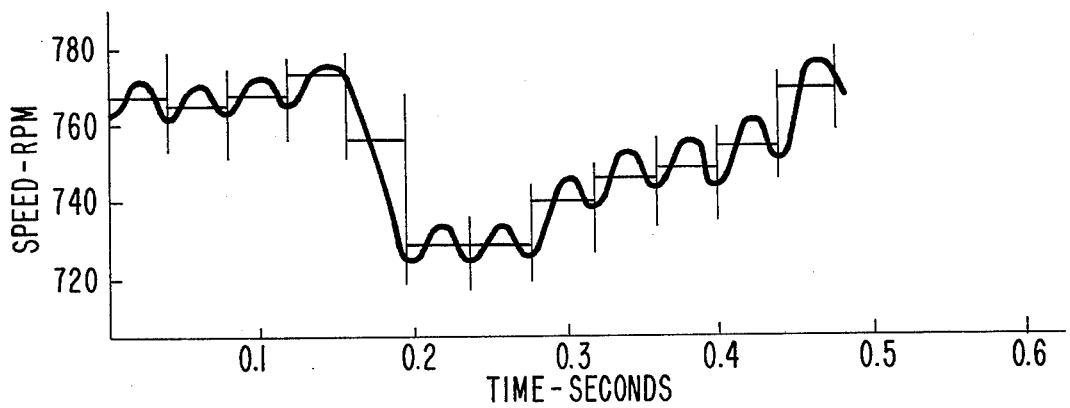
Fig.4 RANDOM MISFIRE
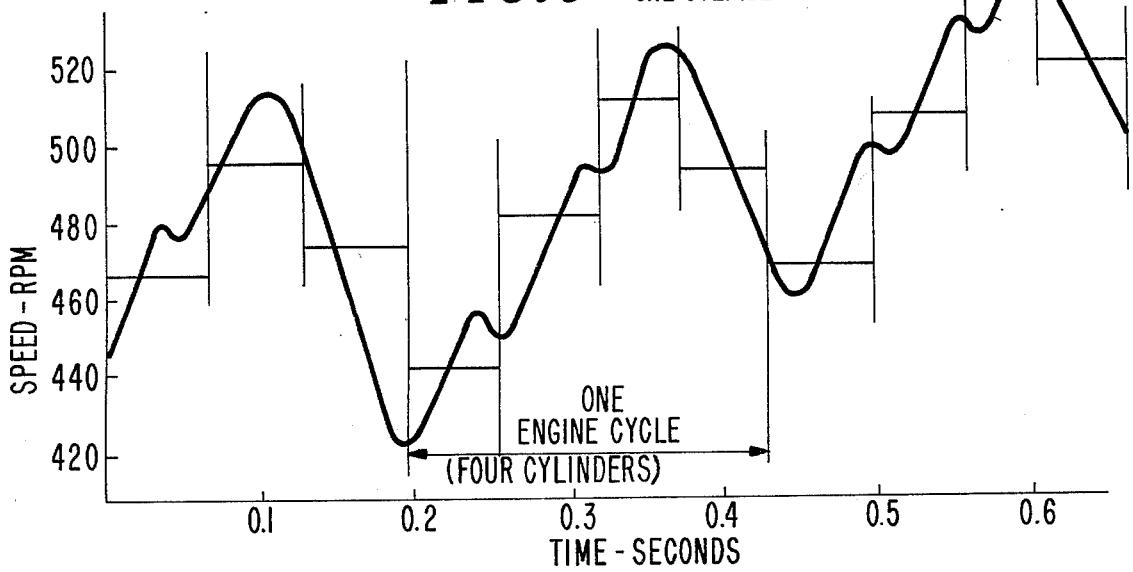
Fig.5 ONE CYLINDER MISFIRING

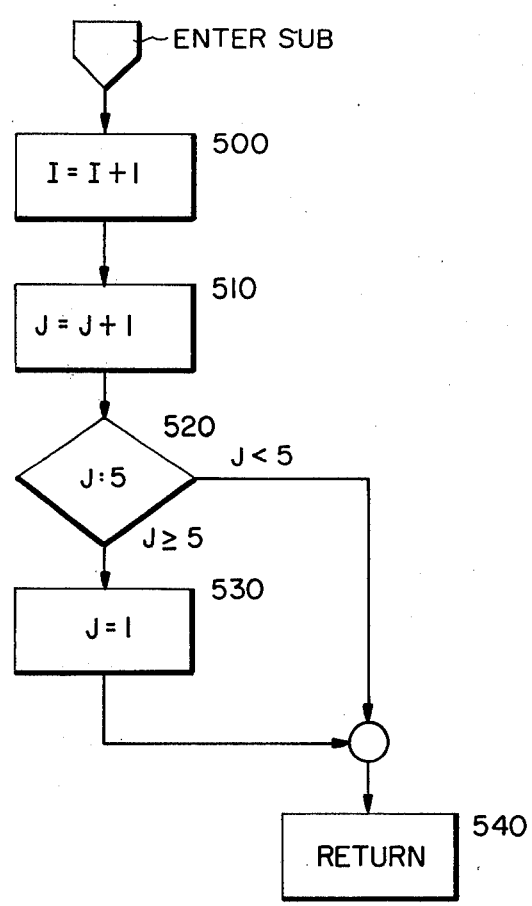

DETECTING MALFUNCTION IN CYLINDERS OF INTERNAL COMBUSTION ENGINES

The invention herein described was made in the course of or under a contract or subcontract thereunder with the Department of the Army.

BACKGROUND OF THE INVENTION

There is an undisputed need for rapid, accurate, reliable and inexpensive means for and method of testing and diagnosing malfunctioning in internal combustion engines of both the spark-ignition and the compression-ignition (diesel) types. The need can best be met by using electronic means, particularly by means including a minicomputer or microprocessor. One troublesome diagnostic task is determining whether the cause of irregular or inferior operation of an engine is due to causes affecting all cylinders in a random fashion, or to causes affecting only a particular one or ones of the cylinders. That is, parts of the ignition system and of the fuel-supplying system affect all cylinders randomly or equally, and other parts affect solely one cylinder. For example, a carburetor and an ignition timer each affect all cylinders, whereas a spark plug, a fuel injector, and a valve each affect only one cylinder.

SUMMARY OF THE INVENTION

A diagnostic apparatus and method for internal combustion engines relies on the fact that the speed of an engine crankshaft experiences an almost instantaneous increase during the firing of the fuel in each fully operative individual cylinder; and experiences an almost instantaneous decrease whenever a cylinder fails to fire or for any reason operates marginally. The deceleration rate during each power period (time from when one cylinder should ignite fuel to when next cylinder should ignite fuel) is compared with an average deceleration for the respective cylinder to identify a random malfunction affecting any cylinder. The average deceleration rates of the respective cylinders are compared to identify a malfunction affecting solely one cylinder in a very repetitive manner. Deceleration rates during a misfire are substantially constant at all engine speeds, so that the test comparisons validly can be made at any desired or convenient engine speed.

BRIEF DESCRIPTION OF THE DRAWING

FIG. 3 is a chart of instantaneous speed changes in a normal engine;

FIG. 4 is a chart of instantaneous speed changes in an engine suffering a random misfire in one cylinder;

FIG. 5 is a chart of instantaneous speed changes in an engine suffering repeated misfiring in one cylinder;

FIGS. 6a and 6b are a flow chart of a program used in the computer in FIG. 1 to control the test procedure and compute the test results.

DESCRIPTION OF THE PREFERRED EMBODIMENT

Figure 1:
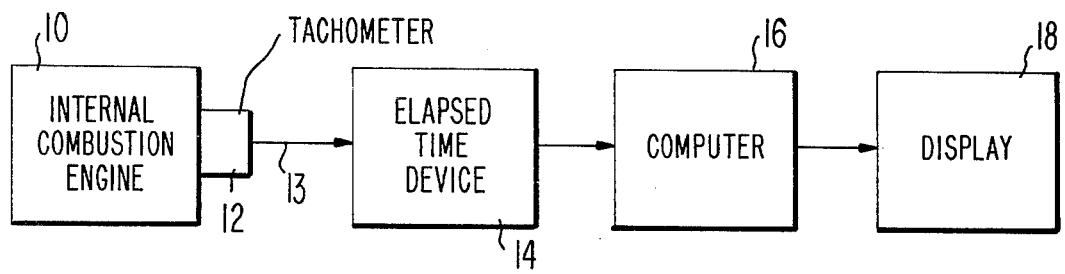
FIG. 1 is a block diagram of an internal combustion engine diagnostic system.

Referring now in greater detail to the drawing, FIG. 1 shows an internal combustion engine 10, equipped with a tachometer 12, from which electrical pulses are applied over line 13 to an elapsed time device 14. The elapsed time device (shown in detail in FIG. 2) operates under the control of a computer 16 to measure time intervals. The computer 16 computes the test results for display by a display device 18.

If the internal combustion engine 10 is a spark ignition engine, the tachometer 12 may be a conventional commercially available unit for obtaining one pulse per power period from the spark ignition system of the engine. If the internal combustion engine 10 is a compression-ignition or diesel engine, the tachometer 12 may be simply a housing with a shaft driven by the engine, and a tooth or teeth on the shaft which passes or pass a magnetic pick-up to produce one electrical pulse in the winding or coil of the pick-up for each tooth on the shaft. The pulse tachometer 12 produces one or more electrical pulses per power period of the engine, and these pulses are applied to an elapsed time device 14 which, if necessary reduces the number of pulses to one pulse per power period.

The engine test to be described utilizes one electrical pulse per power period. One full engine cycle is defined as the time taken for the engine to accomplish intake, compression, power and exhaust in one cylinder. One engine cycle occurs in one crankshaft revolution of a two stroke engine because all four functions are accomplished in two strokes of the piston. On the other hand; one engine cycle occurs during two crankshaft revolutions of a four-stroke engine because the four functions are accomplished in four strokes of the piston. There are as many power periods per engine cycle as there are cylinders in the engine being tested.

Figure 2:
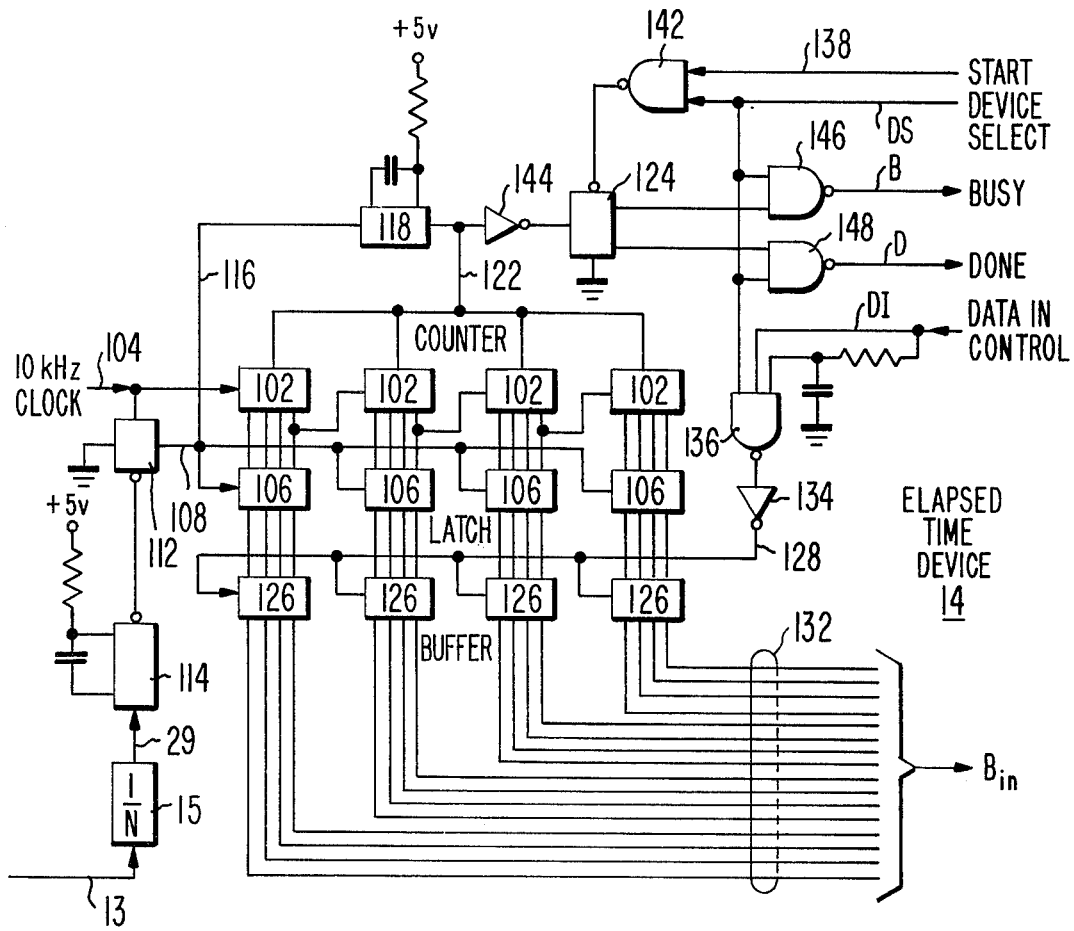
FIG. 2 is a detailed diagram of the elapsed time device in FIG. 1.

FIG. 2 is a circuit diagram of the elapsed time device 14 of FIG. 1. Device 14 receives electrical pulses from tachometer 12 over line 13 and applies them through a divide-by-N-counter 15 to a one-shot multivibrator 114. The divider 15 is provided if the tachometer used produces more than one pulse per power period. The output 29 from the divider 15 is one pulse per power period.

The elapsed time device 14 includes a 16-bit counter each consisting of four 4-bit integrated circuits 102. The counter counts the pulses applied over clock line 104 from a clock (not shown). The 16 outputs from the counter are coupled to 16 stages of a corresponding count latch consisting of integrated circuits 106. The count latch 106 receives and holds the count in the counter 102 when enabled by a transfer signal on line 108 from the transfer latch 112. Transfer latch 112 receives relatively infrequent pulses having a duration greater than the 0.1 msec duration of one cycle of the 10 kHz clock from a one-shot multivibrator 114, which responds to input pulses on line 29 from the divide-by-N counter 24.

The elapsed time unit 14 also includes a 16-bit buffer 126 consisting of four integrated circuits, which can be enabled over line 128 to transfer the 16-bit count in the count latch 106 to the computer 16 via the 16-conductor data bus 132. The buffer 126 is enabled by signals through inverter 134 from nand gate 136. Gate 136 provides an output when it receives both a device select signal over line DS from the computer and an appropriate "data in" control signal over line DI from the computer. In this way the computer can sample the data stored in the counter latches under program control as required. From the counter latches, the computer periodically receives the count which represents the time period between two pulses representative of the engine speed.

In normal operation the elapsed time device 14 is initialized by the computer 16 by a "start" signal applied over line 138 to nand gate 142, simultaneously with a device select signal over line DS. The output of gate 142 causes the third latch 124 to assume a "busy" state. The latch 124 remains in the busy state until set to the "done" state by a signal through inverter 144 from the one-shot 118 when the count in counter 102 is transferred to the count latch 106. The busy or done status of the counter of the timing unit is available to the computer 41 through line B and D whenever the gates 146 and 148 are enabled by a "device select" signal on line DS from the computer.

In summary, the elapsed time device 14 continually measures and latches the time periods between successive pulses occurring once per engine power period, and sets its own state to "done" each time an engine power time period is stored. The computer can then cause a transfer of the stored count in the latch through the buffer to the computer. The computer sets the timing device to the "busy" state whenever continued measuring of time periods is needed.

The elapsed time device 14 is not needed if the computer 16 employed includes a real time clock, and the program for the computer causes the computer to perform the time period measuring and storing function performed by the device 14.

The computer 16 may, by way of example only, be a "Nova 1200" minicomputer manufactured and sold by Data General Corporation, Southboro, Mass. 01772. The Nova 1200 is a low cost minicomputer designed for general purpose applications. It has a 16-bit word, multi-accumulator central processor, and a full memory cycle time of 1200 nanoseconds. It executes arithmetic and logical instructions in 1350 nanoseconds. The entire Nova 1200 central processor fits on a single 15-inch-square printed circuit subassembly board. The basic computer includes four thousand 16-bit words of core memory, a Teletype interface, programmed data transfer, automatic interrupt source identification, and a direct memory access channel. User programming conveniently can be in the BASIC language.

The display device 18 (FIG. 1) for use with the Nova 1200 computer may be a conventional Teletypewriter, a printer, a 4-digit display such as one including Numitron character display tubes, or any other similar display device.

OPERATION

The operation of the system of FIG. 1 will now be briefly described with references to the charts of FIGS. 3, 4, and 5, and later will be described in greater detail with references to the flow chart of FIG. 6.

In the initial cndition, the engine 10 is operated at an idle speed which may be any speed in the range of about 500, 600 or 700 rpm, the tachometer 12 supplies pulses to the elapsed time device 14 which is continuously counting the time periods between power period pulses after receiving a "start" signal from the computer 16. If the engine is operating normally at an idle speed of about 620 rpm, the data accumulated and processed by computer 16 may be as shown in Table 1–3 below, and as plotted in FIG. 3. The Input Time Periods listed in Table 1–3 correspond with the power periods bounded by the vertical lines in FIG. 3. The Δ Time Measurements in Table 1–3 represent changes in Input Time Periods from one engine power period to the next engine power period. The Average Speed in Table 1–3 is the reciprocal of the Input Time Period for the corresponding engine power period multiplied by a constant so that the Average Speed is given in revolutions per minute (RPM). The Average Speed is represented in FIG. 3 by the horizontal lines in each power period at appropriate levels relative to the RPM scale at the left of the chart. The wavy line in FIG. 3 is a hand-drawn approximation of the instantaneous and continuous fluctuations in engine speed due to time-spaced explosions in individual cylinders in a normally functioning engine under test.

A random single misfire in one cylinder of a four-cylinder, four-cycle engine is represented by the data in Table 1–4 and the chart of FIG. 4. The misfire results in an abrupt reduction in instantaneous speed during the power period in which the misfire occurs.

Table 1-3

| Input Time Period (0.1 msec) | Idle Speed Data - Normal Engine | | | |
|---|---|---|---|---|
| | Δ Time Measurements (0.1 msec) | Time to End of Period (Seconds) | Average Speed (RPM) | Deceleration Rate (RPM/sec) |
| 490 | | 0.0490 | 612 | |
| 482 | 8 | 0.0972 | 622 | −209.1 |
| 483 | −1 | 0.1455 | 621 | 26.7 |
| 474 | 9 | 0.1929 | 633 | −246.5 |
| 483 | −9 | 0.2412 | 621 | 246.5 |
| 473 | 10 | 0.2885 | 634 | −274.7 |
| 477 | −4 | 0.3362 | 629 | 112.0 |
| 467 | 10 | 0.3829 | 642 | −285.3 |
| 470 | −3 | 0.4299 | 638 | 87.5 |
| 469 | 1 | 0.4768 | 640 | −29.0 |
| 476 | −7 | 0.5244 | 630 | 199.0 |
| 470 | 6 | 0.5714 | 638 | −170.1 |
| 476 | −6 | 0.6190 | 630 | 170.1 |

Table 1-4

| Input Time Period (0.1 msec) | Idle Speed Data - 1 Random Misfire | | | |
|---|---|---|---|---|
| | Δ Time Measurements (0.1 msec) | Time to End of Period (Seconds) | Average Speed (RPM) | Deceleration Rate (RPM/sec) |
| 391 | | 0.0391 | 767 | |
| 392 | −1 | 0.0783 | 765 | 50.0 |

Table 1-4-continued

| | Idle Speed Data - 1 Random Misfire | | | |
|---|---|---|---|---|
| Input Time Period (0.1 msec) | Δ Time Measurements (0.1 msec) | Time to End of Period (Seconds) | Average Speed (RPM) | Deceleration Rate (RPM/sec) |
| 391 | 1 | 0.1174 | 767 | −50.0 |
| 388 | 3 | 0.1562 | 773 | −152.3 Misfire |
| 397 | −9 | 0.1959 | 756 | 446.6 ← |
| 412 | −15 | 0.2371 | 728 | 680.2 |
| 412 | 0 | 0.2783 | 728 | 0.0 |
| 406 | 6 | 0.3189 | 739 | −263.1 |
| 402 | 4 | 0.3591 | 746 | −182.0 |
| 401 | 1 | 0.3992 | 748 | −46.4 |
| 398 | 3 | 0.4390 | 754 | −141.2 |
| 390 | 8 | 0.4780 | 769 | −392.4 |
| 389 | 1 | 0.5169 | 771 | −50.8 |

Table 1-5

| | Idle Speed Data - 1 Cylinder Misfiring | | | |
|---|---|---|---|---|
| Input Time Period (0.1 msec) | Δ Time Measurements (0.1 msec) | Time to End of Period (Seconds) | Average Speed (RPM) | Deceleration Rate (RPM/sec) |
| 643 | | 0.0643 | 467 | −430.8 |
| 605 | 38 | 0.1248 | 496 | −469.6 Misfire |
| 633 | −28 | 0.1881 | 474 | 354.3 ← |
| 679 | −46 | 0.2560 | 442 | 489.4 |
| 622 | 57 | 0.3182 | 482 | −622.4 |
| 586 | 36 | 0.3768 | 512 | −490.6 Misfire |
| 608 | −22 | 0.4376 | 493 | 310.3 ← |
| 639 | −31 | 0.5015 | 469 | 384.0 |
| 590 | 49 | 0.5605 | 508 | −634.5 |
| 558 | 32 | 0.6163 | 538 | −508.0 Misfire |
| 576 | −18 | 0.6739 | 521 | 296.3 ← |

Repeated misfires in the same one cylinder of the engine are represented by the data in Table 1–5 and the chart of FIG. 5. The three abrupt speed reductions shown occur in every fourth power period of the four cylinder engine.

The three engine conditions illustrated are distinguished by computing and comparing the deceleration rates between power periods during the test, which may extend over about 200 engine cycles. The three conditions are accurately and positively distinguished without regard for the actual idle speed of the engine during the test. It will be noted that the three illustrated tests were performed with the engine operating at average speeds of about 620 rpm, 750 rpm and 470 rpm. The actual speed reductions during misfires vary in accordance with engine speed, and therefore a simple comparison of speed change from one engine cycle to the next is not a reliable way to detect misfires at all idle speeds normally encountered in practice.

The last columns in each of Tables 1–3, 1–4 and 1–5 contain calculated deceleration rates between the corresponding engine cycle and the preceding engine cycle. Positive values represent deceleration, and negative values represent acceleration. A misfire is indicated whenever the deceleration rate exceeds 250. A deceleration rate exceeding 250 in the next following engine cycle is ignored because it is due to the preceding misfire.

The computer program, to be described in detail, first collects Input Time Periods for about 200 power periods in a four cycle engine. The average Deceleration Rate for the 50 power periods of each cylinder are calculated, and each individual Deceleration Rate is compared with the average Deceleration Rate for the respective cylinder to detect individual random misfires. If the number of random misfires exceeds a predetermined limit value, the conclusion EXCESSIVE RANDOM MISFIRES is displayed on the display device 18.

A comparison is also made of the average Deceleration Rates of the 50 power periods in the four different cylinders to determine the weakest cylinder having the largest average Deceleration Rate and the strongest cylinder having the smallest average Deceleration Rate. If the difference between the largest and smallest average Deceleration Rates exceeds a predetermined value, the conclusion CYLINDER POWER UNBALANCE is displayed on the display device 18. Otherwise, the conclusion PASSED IDLE PERFORMANCE TEST is displayed.

Figure 6A:
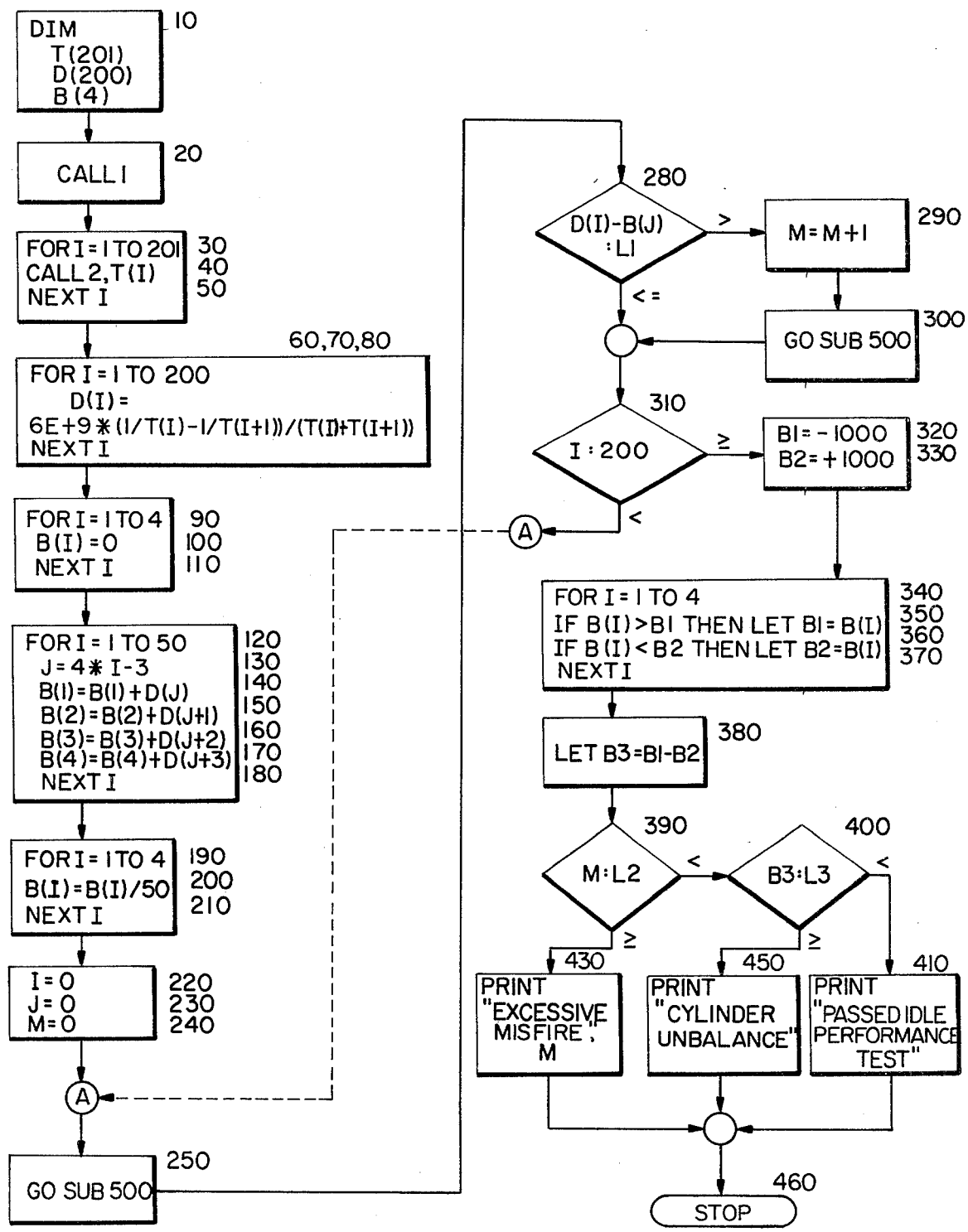

The operation of the system in performing the test of an internal combustion engine will now be described in detail with references to the flow chart of FIGS. 6a and 6b.

Program Description

| Statement Nos. | Statement and Function |
|---|---|
| 10 | DIM T(201), D(200), B(4). This statement simply allocates memory space within the computer for data arrays to be used by the computer during test operation. |
| 20 | CALL 1. Execution of this instruction by the computer sends a START pulse to the Elapsed Time Device (14). This sets the device to the Busy state which essentially initializes the system preparing it for time period (speed) measurements. |
| 30 | FOR I = TO 201. |
| 40 | CALL 2, T(I). |
| 50 | NEXT I. This set of instructions forms an instruction loop which executes the middle instruction 201 times, starting with a value of I=1 and incrementing the value of I by 1 each time. The middle instruction (4) causes the system to wait for the next Elapsed Time Device (14) input pulse (one per engine firing) and then the computer inputs the time period between the last two pulses (in 0.1 msec units). This value is saved as T(I). Thus, the first |

Program Description-continued

| Statement Nos. | Statement and Function |
|---|---|
| | pulse period measured is saved as T(1), the next as T(2), etc. until T(201) is input and saved. When all 201 time periods have been measured and saved the program continues on to the next block of instructions. Typical input values are shown in Tables 1-3, 1-4, and 1-5. |
| 60 | FOR I = 1 TO 200. |
| 70 | D(I) = 6E + 9*(1/T(I) − 1/T(I+1))/(T(I)+T(I+1)). |
| 80 | NEXT I. As with the last set of instructions, this set forms an instruction loop which repeatedly executes the middle instruction, while incrementing the value of I. However, in this case the loop is only repeated 200 times as indicated by instruction 60. This middle instruction (70) calculates the average deceleration rate (in units of RPM/SEC) between each successive pair of input time periods saved as T(I). The actual function calculated is $$D(I) = \frac{\frac{1}{T(I)} - \frac{1}{T(I+1)}}{T(I) + T(I+1)}(6 \times 10^9)$$ Tables 1-3, 1-4, and 1-5 list typical values for D(I) calculations for a nonmisfiring engine, randomly misfiring engine, and periodically misfiring engine, respectively. |
| 90 | FOR I = 1 TO 4. |
| 100 | B(I) = 0 |
| 110 | NEXT I. The array B(1), B(2), B(3), B(4) is used later in the program to calculate the average deceleration rates corresponding to each cylinder (4 elements in the array for a 4 cylinder engine). This program loop initializes the array and sets all four elements of the B array to zero. |
| 120 | FOR I = 1 TO 50. |
| 130 | J = *I − 3. |
| 140 | B(1) = B(1) + D(J) |
| 150 | B(2) = B(2) + D(J + 1) |
| 160 | B(3) = B(3) + D(J + 2) |
| 170 | B(4) = B(4) + D(J + 3) |
| 180 | NEXT I. This program loop executes instructions 130 to 170 fifty times while incrementing the counting parameter I from 1 to 50. Upon completion of this program loop every fourth deceleration rate in the D array (200 deceleration rates), starting with the first, is summed together and stored in B(1). Similarly, every fourth value starting with the second, is summed in B(2), and the resulting total sum left in B(2), and the same for B(3) and B(4) with respect to every fourth value starting with the third and fourth elements of the D array. |
| 190 | FOR I = 1 TO 4. |
| 200 | B(I) = B(I)/50. |
| 210 | NEXT I. This program loop simply performs four divisions to calculate the average deceleration for each cylinder. The functions performed are: B(1) = B(1)/50 B(2) = B(2)/50 B(3) = B(3)/50 B(4) = B(4)/50 where the four average decelerations are now stored in B(1) through B(4). NOTE: At this point in the test sequence the test system has measured or calculated all of the data that it requires for misfire detection. The remainder of the test sequence checks each deceleration data point for excessive deviation from the average for the corresponding cylinder, checks for excessive variation between average decelerations, and evaluates and prints out the results of the vehicles idle performance test. |
| 220 | I = 0. |
| 230 | J = 0 |
| 240 | M = 0. Program statements 220 through 310 control the test system during the test for excessive deviation from the average. Parameters I, J, and M are used as counting variables in this part of the program. I counts deceleration data points from 1 to 200. J counts cylinder position so that deceleration data can be correlated with the average deceleration for the appropriate cylinder. |
| | M counts misfire indications. Instructions 220, 230, and 240 simply initialize these counting variables to zero. |
| 250 | GO SUB 500. At this point in the program the test system wants to do exactly the same thing as it does at another point in the program. Thus, a subprogram has been created starting at statement 500 to perform this task. Statement 250 simply causes the computer to jump to the subroutine starting at 500 and when the subroutine is completed the test routine will continue on with the next sequential instruction (280). |
| 500 | I = I + 1 |
| 510 | J = J + 1. Subroutine 500 is an incrementing subroutine. Its purpose is to increment both the I and J counting variables and to reset J to 1 whenever its value becomes greater than the number of cylinders in the engine being tested (4 for the present example). The above two instructions simply increment the I and J parameters. |
| 520 | IF J < 5 THEN GO TO 540. |
| 530 | J = 1. These two instructions check to see if J has exceeded the number of cylinders (4) and then set J as required. If J is less than 5, it is fine as is and the computer jumps directly to statement 540. Otherwise (J = 5) J is reset to a value of 1 and then the computer continues on to statement 540. |
| 540 | RETURN. This statement identifies the end of a subroutine and causes the computer to jump back into the normal program instruction flow and execute the instruction following the one which called this subroutine. |
| 280 | IF D(I) − B(J) <= L1 THEN GO TO 310. |
| 290 | M = M + 1. |
| 300 | GO SUB 500. This instruction set detects random misfires (280) and then appropriately sets the counters before continuing testing. Execution of statement 280 substracts the average deceleration rate for the appropriate cylinder (B(J)) from the individual deceleration rate being tested. The result is then compared with the limit L1 to check for a random misfire. If the result is greater than the limit L1, M is incremented by one to count a misfire and I and J are incremented (as done by subroutine 500) so that the test system will skip the next deceleration data point. The reason for this data skip is obvious from the last column of Table 1-4. Notice that a single misfire is apt to affect two deceleration data points. Thus, the program automatically skips one to insure against incorrectly identifying too many misfires. |
| 310 | IF I < 200 THEN GO TO 250. Execution of this statement causes the computer to check if all deceleration data has been checked for random misfires, if not I would be less than 200 and the computer next executes instruction 250. If all have been processed the computer moves on to the next sequential instruction (320). |
| 320 | B1 = −1000. |
| 330 | B2 = +1000. The parameter B1 is used to find the largest average deceleration in the B array. To initialize it for this purpose, execution of instruction 320 sets it to a low value (−1000). Similarly, statement 330 initializes B2 to a high value (+1000) so that it can be used to find the smallest deceleration in the B array. |
| 340 | FOR I = 1 TO 4. |
| 350 | IF B(I) > B1 THEN LET B1 = B(I). |
| 360 | IF B(I) < B2 THEN LET B2 = B(I). |
| 370 | NEXT I. These four statements form a program loop which executes statements 350 and 360 four times for I equals 1 to 4. After execution of this program loop, the value of B1 will be equal to the largest of the four B array elements and B2 will be equal to the smallest of the four B array elements. Relating this to the engine B1 will be the largest average deceleration rate which would correspond to the weakest cylinder in the engine and B2 will be the smallest average deceleration rate which would correspond to the strongest cylinder (and would be a negative number signifying acceleration rather than |

Program Description-continued

| Statement Nos. | Statement and Function |
|---|---|
| | deceleration). |
| 380 | B3 = B1 − B2. This statement simply takes the difference between B1 and B2 and stores the result as B3 which will be used to check for periodic misfire later in the test sequence. |
| 390 | IF M >= L2 THEN GO TO 430. |
| 400 | IF B3 >= L3 THEN GO TO 450. These two statements perform the final engine idle performance evaluation. In instruction 390 M is compared to a limit L2 to see if there is excessive random misfire. If M is greater than or equal to the limit, the computer jumps to statement 430 to print out the test result. Otherwise the computer performs the comparison of statement 400 where B3 is compared to L3. Excessive variation of the cylinder averages is indicated by B3 being greater than or equal to the limit L3. If such is the case, the computer jumps to statement 450 to print out the test result. If both performance tests are passed (M < L2 and B3 < L3) the computer will next execute statement 410. |
| 410 | PRINT "PASSED IDLE PERFORMANCE TEST" |
| 420 | GO TO 460. |
| 430 | PRINT "EXCESSIVE RANDOM MISFIRES". |
| 440 | GO TO 460. |
| 450 | PRINT "CYLINDER POWER UNBALANCE". |
| 460 | STOP. The above statements simply print the appropriate result as indicated and branch to statement 460 to stop the test. |

Figure 7:
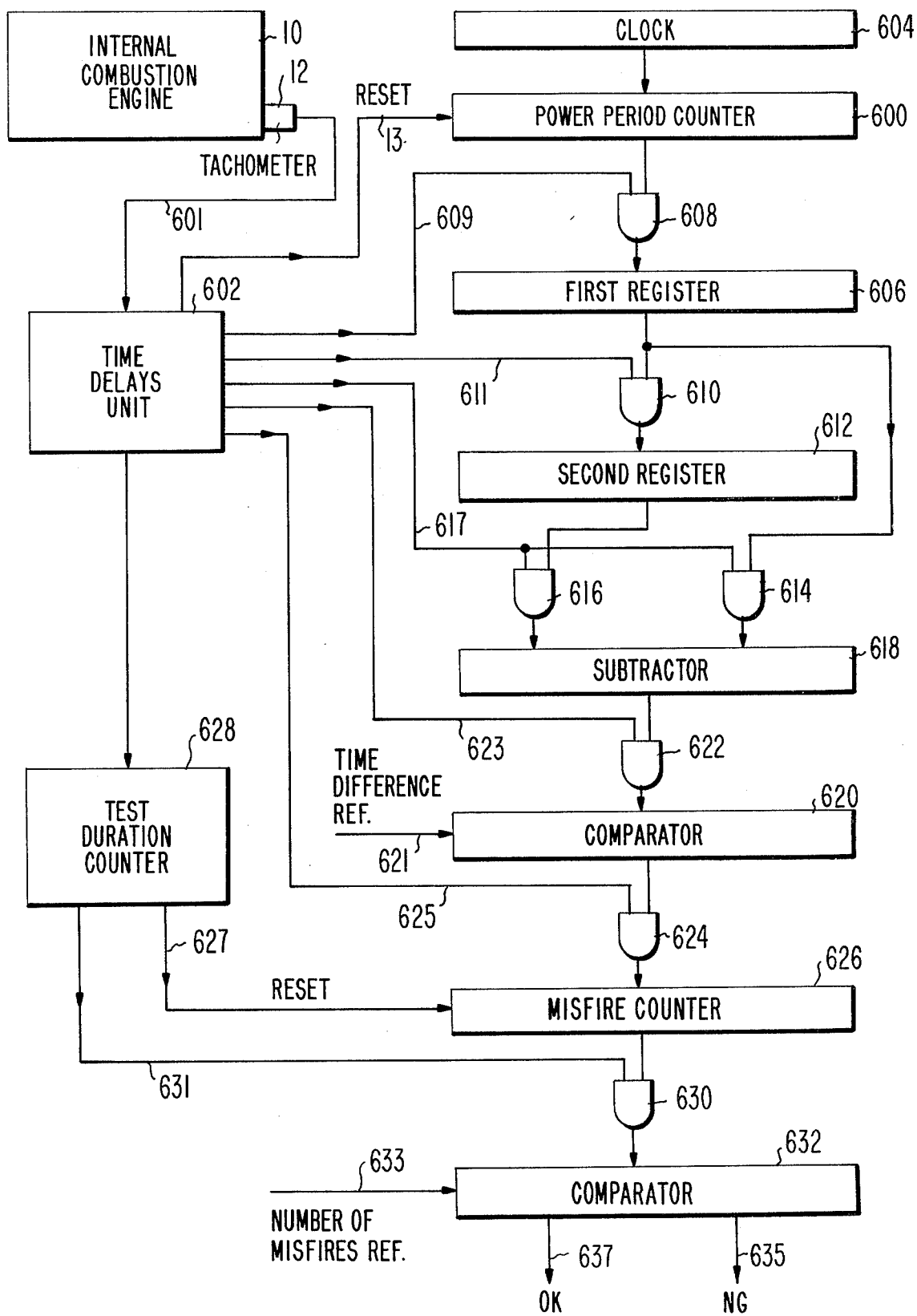
FIG. 7 is a block diagram of an alternative apparatus for diagnosing malfunctions in individual cylinders of an internal combustion engine.

Reference is now made to FIG. 7 for a description of an alternative apparatus for detecting malfunctioning in individual cylinders of an internal combustion engine 10. The output pulses from the tachometer 12 are applied over lead 601 to a time delays unit 602 which has a plurality of outputs each of which provides output pulses having a desired delay relative to the input pulses on line 13. The purpose of time delays unit 602 is to provide gate-enabling pulses timed to insure the orderly transfer of counts from a counter 600 down through intervening units to a comparator 632. That is, data is transferred on from a unit slightly before new data is applied to the unit.

The power period counter 600 counts the input pulses applied to it from a clock 604. The clock 604 runs at a rate of 10 kHz or more in order to provide a sufficient resolution in the time periods measured by the counter 600 in the intervals between the applications of successive reset pulses thereto from the time delays unit 602.

The count in counter 600 is transferred to first register 606 through a gate 608, which is enabled over lead 609 from time delays unit 602 at a time slightly earlier than the time when a reset pulse is applied over line 13 to the counter 600. The gate symbol 608 represents an array of gates equal in number to the number of bits in the counter 600.

The count in the first register 606 is transferred through a gate 610 to a second register 612 every time the gate 610 is enabled over line 611, which is a time slightly earlier than the time when gate 608 is enabled.

The contents of the first register 606 and the contents of the second register 612 are simultaneously transferred through multi-unit gates 614 and 616, respectively, to the two inputs of a subtractor 618. These transfers are made by enabling the gates over line 617 at a time slightly prior to the time that gate 610 is enabled. The subtractor may, of course, be an adder in which the sign of one of the inputs is made to be negative, so that the addition performed is actually subtraction. The count in the second register 612 is subtracted from the count representing the following time period in the first register 606.

The time-difference-representing count produced by the subtractor is transferred to a comparator 620 through a multi-unit gate 622 when enabled over line 623 by a pulse occurring slightly prior to the pulse which enables gates 614 and 616. The comparator 620 also receives a count over multi-conductor line 621 which represents a time-difference reference value for comparison with the measured time difference from subtractor 618. If the measured time difference is greater than the reference value, the comparator 620 produces a misfire-representing output which is passed, if present, through multi-unit gate 624 enabled over line 625 to a misfire counter 626 at a time slightly after the time that gate 622 is enabled.

The misfire counter 626 is reset to zero by a pulse over line 627 from a test duration counter 628. The counter 628 receives pulses at the power period frequency over line 629 from time delays unit 602, and the counter 628 provides an output after counting a number, such as 200, if the input pulses to provide a time period during which the number of misfires are counted by the misfire counter 626.

The count in the misfire counter 626 is transferred out through multi-unit gate 630 when enabled by a pulse over line 631 from test duration counter 628 at a time slightly following the resetting of the misfire counter 626. The count passed by gate 630 is applied to a comparator 632 which also receives, at 633, a number-of-misfires reference value. If the measured number of misfires from misfire counter 626 exceeds the reference number of misfires entered at 633, the comparator provides a "test failed" output at 635. Otherwise, a "test passed" output is provided at 637.

The apparatus of FIG. 7 for detecting malfunctioning in individual cylinders of an internal combustion engine is seen to include a tachometer 12, a period counter 600 and a clock 604 for measuring the engine power time periods between crankshaft positions representing the successive ignition times in successively-fired cylinders of the engine. The subtractor 618 subtracts each measured time interval in the second register 612 from the following measured time period in first register 606 to detect whether there is a positive difference representing a momentary reduction in engine speed. The comparator 620 produces a fault output whenever a time difference exceeds a predetermined reference limit value, to provide an indication of a significant fault in an individual cylinder. The misfire counter 626 counts the number of faults occurring during a predetermined period. And, comparator 632 determines whether the number of faults exceeds a predetermined reference limit value above which engine performance is considered unsatisfactory.

What is claimed is:

1. Apparatus to detect malfunctioning in individual cylinders of an internal combustion engine, comprising:
   means for measuring the engine power time periods between crankshaft positions representing successive ignition times in successively fired cylinders of the engine,
   means to compute the individual deceleration rates between successive time periods,
   means to compute the average deceleration rate for each cylinder, and means to compare each individual deceleration rate with average deceleration rate for the corresponding cylinder, and to register a misfire when the individual deceleration rate exceeds the average by more than a predetermined limit value.

2. Apparatus as defined in claim 1, and, in addition, means to compare the number of misfires registered with a predetermined limit number, and to display EXCESSIVE RANDOM MISFIRES if the number of misfires exceeds the limit number.

3. Apparatus as defined in claim 2, and, in addition, means to compare the average deceleration rates of the weakest cylinder having the largest average deceleration rate and the strongest cylinder having the smallest average deceleration rate, and to display CYLINDER POWER UNBALANCE when the difference in the rates exceeds a predetermined limit value, and means to otherwise display PASSED IDLE PERFORMANCE TEST.

4. The method of detecting malfunctioning in individual cylinders of an internal combustion engine, comprising the steps of:
measuring the engine power time periods between crankshaft positions representing successive ignition times in successively fired cylinders of the engine,
subtracting each measured time period from the following measured time period to determine individual deceleration rates between successive time periods,
computing the average deceleration rate for each cylinder, and
comparing each individual deceleration rate with the average deceleration rate for the corresponding cylinder, and registering a misfire when the individual deceleration rate exceeds the average by more than a predetermined limit value.

5. The method as defined in claim 4, and in addition comparing the number of misfires registered with a predetermined limit number, and to display EXCESSIVE RANDOM MISFIRES if the number of misfires exceeds the limit number.

6. The method as defined in claim 5, and in addition, comparing the average deceleration rates of the weakest cylinder having the greatest average deceleration rate and the strongest cylinder having the smallest average deceleration rate, and to display CYLINDER UNBALANCE when the difference in the rates exceeds a predetermined limit value, and otherwise displaying PASSED IDLE PERFORMANCE TEST.

7. Apparatus to detect malfunctioning in individual cylinders of an internal combustion engine, comprising:
means for measuring the engine power time periods between crankshaft positions representing successive ignition times in successively fired cylinders of the engine,
means for subtracting each measured time interval from the following measured time period to detect whether there is a positive difference representing a momentary reduction in engine speed,
comparator means producing a fault output whenever a time difference exceeds a predetermined limit value, to provide an indication of a significant fault in an individual cylinder,
means for counting the number of faults occurring during a predetermined period, and
comparator means for determining whether the number of faults exceeds a predetermined limit value above which engine performance is considered unsatisfactory.

* * * * *

UNITED STATES PATENT OFFICE
CERTIFICATE OF CORRECTION

PATENT NO. : 3,972,230
DATED : August 3, 1976
INVENTOR(S) : Richard Eric Hanson & William Fulmer Fordyce It is certified that error appears in the above-identified patent and that said Letters Patent are hereby corrected as shown below:

Column 4, line 14, Change "cndition" to --condition--

Column 7, statement 130, Change "J=*I-3" to --J=4*I-3--.

Signed and Sealed this

Twenty-eighth Day of September 1976

[SEAL]

Attest:

RUTH C. MASON
*Attesting Officer*

C. MARSHALL DANN
*Commissioner of Patents and Trademarks*